United States Patent [19]

Rosenthal et al.

[11] 4,400,428

[45] Aug. 23, 1983

[54] SEALABLE MULTILAYER FILMS

[75] Inventors: Heinrich Rosenthal; Ingo Schinkel, both of Walsrode; Günter Eger, Bomlitz; Wolfgang Bair, Walsrode, all of Fed. Rep. of Germany

[73] Assignee: Wolff Walsrode Aktiengesellschaft, Walsrode, Fed. Rep. of Germany

[21] Appl. No.: 365,853

[22] Filed: Apr. 5, 1982

Related U.S. Application Data

[63] Continuation-in-part of Ser. No. 313,022, Oct. 19, 1981.

[30] Foreign Application Priority Data

Apr. 8, 1981 [DE] Fed. Rep. of Germany ....... 3114171

[51] Int. Cl.$^3$ .............................................. C09J 7/02
[52] U.S. Cl. .................................... 428/349; 428/448; 428/451; 428/516; 428/518; 428/910
[58] Field of Search ............... 428/516, 910, 518, 349, 428/448, 451

[56] References Cited

U.S. PATENT DOCUMENTS 4,291,085  9/1981  Ito et al. .......................... 428/516 X
4,293,608  10/1981  Isaka et al. ......................... 428/517
4,294,889  10/1981  Hashimoto ...................... 428/517 X

FOREIGN PATENT DOCUMENTS 2644209  5/1977  Fed. Rep. of Germany .

Primary Examiner—P. Ives
Attorney, Agent, or Firm—Sprung, Horn, Kramer & Woods

[57] ABSTRACT

A composite film comprising a polypropylene basis film being laminated at least on one surface with a layer combination of a heat sealable layer with an additive combination, an adhesion promotion layer, a gas-barrier layer, and an adhesion promotion layer and optionally a further heat sealable layer.

15 Claims, No Drawings

SEALABLE MULTILAYER FILMS

This is a continuation-in-part application of my application Ser. No. 313,022, filed Oct. 19, 1981.

This invention relates to a heat sealable, stretched multilayer film which, by virtue of its low permeability to gases, is particularly suitable for use as a packaging film for goods of the type which require minimal permeability to gases and flavor or a high aroma retention.

The use of composite films of polyolefins with a sealable layer of ethylene homopolymers or of copolymers as a packaging film has been known for some time. Attempts have already been made to lower the permeability of these composite films to gases by adding a layer of hydrolyzed ethylene/vinyl acetate copolymer. Thus, German Offenlegungsschrift No. 2,644,209=GB-PS 1,567,189 describes a composite film of polypropylene, an adhesion-promoting layer of modified polyolefin, a layer of hydrolyzed ethylene/vinyl acetate copolymer and, optionally a heat-sealable layer of polyolefins. However, composite films of this type have the serious disadvantage that the unsatisfactory slipping properties of this composite film at relatively high packaging speeds result in faulty seals, defective wrapping and deposits on parts of the packaging machines caused by abrasion.

With the composite films according to the invention, it is possible to obviate these disadvantages and to provide a packaging material which, by virtue of its remarkable slipping properties and processibility on machines, is also suitable for high-speed packaging machines and, by virtue of its minimal permeability to gases, may be used in particular for perishable foods.

Accordingly, the present invention provides a heat-sealable composite film comprising a biaxially stretched polypropylene film as the base film, an adhesion-promoting layer of modified polyolefin, a gas-barrier layer of hydrolyzed ethylene/vinyl acetate copolymer and a heat-sealing layer of olefin polymers, wherein the base film carries on at least one surface an optionally at least monoaxially oriented layer combination consisting of (A) a heat-sealable outer layer of polyethylene or of an ethylene copolymer containing at least 3, preferably at least 4% by weight of ethylene;
(B) an adhesion-promoting layer of modified polyolefin;
(C) a gas-barrier layer of a hydrolyzed ethylene/vinyl acetate copolymer containing from 50 to 80 mole percent of vinyl acetate units of which at least 90% are hydrolyzed;
(D) an adhesion-promoting layer of modified polyolefin; and
(E) a layer of polyethylene or of an ethylene copolymer containing at least 3, preferably at least 4% by weight of ethylene;

each of the two layers A and B or D and E or B and C or C and D can be optionally combined into one single layer by mixing the corresponding polymers; layer A contains an additive combination consisting of (a) from 0.3 to 1% by weight, preferably 0.4–0.7, based on the sealable layer, of a long-chain aliphatic amine,
(b) from 0.1 to 0.7% by weight, preferably 0.15–0.50, based on the sealable layer, of a dispersed thermoplastic polymer which is incompatible with the polyethylene or ethylene copolymer and which has a softening point at most 50° C. below or above the softening point of the polyethylene or ethylene copolymer, and
(c) from 0.1 to 1.2% by weight, preferably 0.2–0.7, based on the sealable layer, of a polydialkyl siloxane;

and the base film optionally carries on its other surface a layer A, a layer combination A to E or B and C or one layer of a polymer mixture of the polymers of the layers B and C.

The polypropylene of the core film is preferably an isotactic polypropylene having a density of from 0.90 to 0.91 g/cc and a melt flow index of from 1 to 4 g/10 mins. at 230° C./2.16 kp/cm$^2$ pressure (as measured in accordance with DIN 53 735).

The heat sealable layer polymer consists of an ethylene homo- or co-polymer. A high-density polyethylene or statistical ethylene/propylene copolymers containing at least 4% by weight of ethylene, preferably 95% by weight of propylene and 5% by weight of ethylene, are preferably used.

The heat sealable layer polymer should preferably have a density in the range of from 0.895 to 0.960 g/cc, a melt flow index of from 1 to 7 g/10 mins at 190° C./2.16 kp/cm$^2$ pressure and a crystallite melting point, of from 125° to 148° C. (as measured under a polarization microscope).

Component (a) of the additive combination is a long-chain aliphatic tertiary amine which may optionally be mono-unsaturated, preferably a tertiary amine of which the aliphatic radical has a C-chain length of from $C_{12}$ to $C_{18}$ and which is substituted by two hydroxyalkyl-($C_1$–$C_4$)-groups. N,N-bis-(2-hydroxyethyl)-$C_{12}$–$C_{16}$-alkylamines are particularly preferred.

The thermoplastic polymer which is incompatible with the sealing polymer should have a softening point at most 50° C. below or above the softening point of the sealing polymer and should be dispersed in the sealing polymer, its particle size being from 0.01 to 4 μm and preferbly from 0.1 to 2 μm. Dispersion of the incompatible polymer in the sealing polymer is carried out by standard known methods. Preferred incompatible polymers are thermoplastic resins, such as highly density, high molecular polyethylene (softening point preferably about 129° C.) ethylene/methacrylic acid copolymers (90° to 99° C.), polylauric lactamide (180° C.), acrylonitrile/butadiene/methacrylate copolymers ($\approx$80° C.), and ethylene/vinyl alcohol copolymers ($\approx$185° C.). Ethylene/methacrylic acid copolymers which may be completely or partly present in the form of alkali salts, metal or alkaline earth metal, preferably Zn-salts, or polylauric lactamide are particularly preferred.

The polydialkyl siloxane used as additive component (c) should have a viscosity of $10^5$ to $10^6$ mPa.s preferably a viscosity of at least $10^6$ mPas at 20° C. It is particularly preferred to use polydimethyl siloxane.

The gas-barrier layer preferably consists of an ethylene/vinyl acetate copolymer which consists of from 50 to 80 mole percent and more preferably of from 60 to 75 mole percent of vinyl acetate units of which at least 90% and preferably more than 95% ae hydrolyzed.

The polymer generally has an intrinsic viscosity, as measured in a solvent mixture of 85% by weight of phenol and 15% by weight of water, of preferably from 0.07 to 0.17 l/g and more preferably from 0.09 to 0.15 l/g.

Modified polyolefins are used for producing the adhesion-promoting layer. The polyolefins in question are preferably polyolefins containing carboxyl groups such as, for example, polypropylene or polyethylene containing grafted units of at least one monomer from the group comprising α, β-mono-unsaturated dicarboxylic acids such as, for example, maleic acid, fumaric acid, itaconic acid or their anhydrides, acid esters, acid amides and acid imides; copolymers of ethylene with acrylic acid and/or methacrylic acid and/or their metal salts (Zn, Na) and/or their $C_1$–$C_4$-alkyl esters, or saponified copolymers which are grafted with above mentioned acid monomers.

Grafted products are preferably used.

It is particular preferred to use polyolefins, such as polypropylene or copolymers of propylene and ethylene, containing at most 1.0% by weight of grafted units of α,β-mono-unsaturated dicarboxylic acid anhydrides, such as maleic acid anhydride, and their saponified copolymers.

If the adhesion-promoting polymer is incorporated either in the sealable layer A or in the gas barrier layer C, up to 40% by weight and preferably from 25 to 30% by weight of the modified polyolefin, based on layer-forming polymers, are used for producing the polymer mixture.

By using the combination of additives according to the invention, it is possible to produce multilayer films having very good slipping properties combined with good machine processibility. It is also possible to use the film without the usual electrical treatment which is known to have an adverse effect upon the slipping properties of the film. Neither is there any sign of scratching or hazing of the film such as occurs when known lubricants based on inorganic powders are used. Surprisingly, the affinity of the film for adhesives, for example for the purpose of applying a tear-open strip, is also not adversely affected, although this has to be expected in view of the use of polyalkyl siloxanes as additives.

Accordingly, it had not been expected that the required improvement over known multilayer films would be obtained with the combination of additives according to the invention, especially, since even the use of known lubricants such as, for example, saturated or unsaturated fatty acid amides and relatively high molecular weight substituted fatty acid amides having melting points of from 70° to 150° C., such as for example erucic acid amide, oleic acid amide, alkyl-di-fatty acid amides or N,N-polyethyoxylated fatty acid amides, does not ensure adequate slipability on high-speed packaging machines.

The present invention also relates to the use of the inventive film composites as a packaging material for foods sensitive to oxygen.

The additives may be incorporated in the sealing layer polymer by mixing and the multilayer film may be produced by standard methods, such as lamination or melt extrusion.

It is advantageous to add the additives directly to the sealing layer polymer because this eliminates the need for a complicated additive/masterbatch technique.

It is also advantageous to apply the layer combination to the base film separately from the production of the polypropylene film in a later step.

Biaxial stretching may be carried out by any of the usual stretching techniques. Longitudinal stretching is preferably carried out in a ratio of from 5:1 to 7:1 while transverse stretching is preferably carried out in a ratio of from 7:1 to 10:1.

In the inventive film composite, the polypropylene base film should preferably have a thickness of from 20 to 50 μm and the layer combination should preferably have a thickness of from 2 to 6 μm and more preferably from 3.5 to 5 μm, the sealing layer having a thickness of from 0.8 to 2 μm, preferably of 1 μm, the adhesion-promoting layer a thickness of from 0.1 to 1 μm, preferably from 0.4 to 0.6 μm, and the gas-barrier layer a thickness of from 0.2 to 1.2 μm, preferably from 0.6 to 0.8 μm.

The layers B and D and A and E are preferably identical.

Test Methods

The packaging process is assessed by criteria stipulated by the machine operator, such as throughput, wrapping and absence of deposits. Providing there are no disturbances relating to these criteria during packaging at relatively high speeds, the film may be regarded as satisfactory. Even an occasional disturbance means that the film is unsuitable. It is presupposed that disturbances may be ruled out by optimally setting up the packaging machine before the trial.

In the context of the invention, the sealing strength is understood to be that force which is required to split a seal seam produced under controlled conditions (50 N/cm²/0.5 sec, 130° C., smooth sealing jaws). Sealing strength is expressed in Newtons (N) and is based on a 15 mm wide test strip.

The antistatic behavior of a film is assessed by the ash test. The ash test is carried out after the film has been charged to a certain extent (by rubbing three times in one direction using a woollen cloth). The film is regarded as being sufficiently antistatic if it does not attract cigarette ash from a distance of 3 cm.

Permeability to oxygen is measured in accordance with DIN 53 380. Hazing is measured in accordance with ASTM D 1003-52 and coefficient of friction in accordance with DIN 53 375.

EXAMPLE 1

To produce a layer combination, 0.5% by weight of N,N-bis-(2-hydroxyethyl)-($C_{12}$–$C_{16}$)-alkylamine, 0.5% by weight of an ethylene/methacrylic acid copolymer, in which some of the carboxyl groups are present in the form of Zn-salts and which has a melt index of 5 g/10 mins at 190° C./1 kp/cm² and a melting point of 99° C., and 0.3% by weight of a polydimethyl siloxane having a density of 0.985 g/cc at 20° C. and a viscosity of $10^6$ mPa.s at 20° C. were incorporated into 98.7% by weight of a propylene-ethylene copolymer containing 4.5% by weight of ethylene and having a density of 0.90 g/cc, a melt index of 5 g/10 mins at 230° C./2.16 kp/cm² and a crystallite melting point of 140° C. for layer A and co-extruded with a modified polypropylene, like a saponified copolymer, containing 0.7% by weight of grafted maleic acid anhydride, with a melt index of 5 g/10 mins at 250° C./2.16 kp/cm² for the adhesion-promoting layers and an ethylene/vinyl acetate copolymer containing 55 mole percent of vinyl acetate units, of which 96% are hydrolyzed, for the gas-barrier layer and the above-mentioned propylene-/ethylene copolymer for the layer E, combined with the base film of polypropylene having a desntiy of 0.905 g/cc, a melt index of 2 g/10 mins at 230° C./2.16 kp/cm² and a softening range of 160° to 166° C. by standard methods and stretched in such a way that a composite film stretched in a ratio of 5:1 in the longitudinal direction and in a ratio of 10:1 in the transverse direction was obtained.

The layer structure and the properties of the completed film are shown in the following Tables.

EXAMPLE 2

To produce a layer combination, 0.5% by weight of N,N-bis-(2-hydroxyethyl)-($C_{12}$–$C_{16}$)-alkylamine, 0.2% by weight of polylauric lactamide having a density of 1.01 g/cc, a viscosity number (according to DIN 53 729) of 250 and a melting range of 176° to 180° C., and 0.3% by weight of a polydimethyl siloxane having a density of 0.985 g/cc at 20° C. and a viscosity of $10^6$ mPa.s at 20° C. were incorporated into 99.0% by weight of a propylene/ethylene copolymer containing 4.5% by weight of ethylene and having a density of 0.90 g/cc, a melt index of 5 g/10 mins at 230° C./2.16 kp/cm² and a crystallite melting point of 140° C. for layer A, co-extruded and combined by standard methods with the base film a polypropylene having a density of 0.905 g/cc, a melt index of 2 g/10 mins at 230° C./2.16 kp/cm² and a softening range of 160° to 166° C., followed by stretching in such a way that a composite film stretched in a ratio of 5:1 in the longitudinal direction and in a ratio of 10:1 in the transverse direction was obtained.

The layer structure and properties of the finished film are shown in the following Tables.

EXAMPLE 3

To produce a layer combination, 0.5% by weight of N,N-bis-(2-hydroxyethyl)-($C_{12}$–$C_{16}$)-alkylamine, 0.5% by weight of an ethylene/methacrylic acid copolymer, in which the carboxyl groups are partly present in the form of Zn-salts and which has a density of 5 g/10 mins at 190° C./1 kp/cm² and a melting point of 99° C., and 0.7% by weight of a polydimethyl siloxane having a density of 0.985 g/cc at 20° C. and a viscosity of $10^6$ mPa.s at 20° C. were incorporated into 98.3% by weight of a propylene/ethylene copolymer containing 4.5% by weight of ethylene and having a density of 0.90 g/cc, a melt index of 5 g/10 mins at 230° C./2.16 kp/cm² and a crystallite melting point of 140° C. for layer A, and co-extruded with a modified propylene-/ethylene copolymer, like a saponified copolymer, containing 0.5 % by weight of grafted maleic acid anhydride, with a melt index of 10 g/10 mins at 250° C./2.16 kp/cm² for the adhesion-promoting layers and an ethylene/vinyl acetate copolymer containing 55 mole percent of vinyl acetate units, of which 96% are hydrolyzed for the gas-barrier layer and the above-mentioned propylene/ethylene copolymer for layer E, united by standard methods with the base film of polypropylene having a density of 0.905 g/cc, a melt index of 2 g/10 mins at 230° C./2.16 kp/cm² and a softening range of 160° to 166° C., and stretched in such a way that a composite film stretched in a ratio of 5:1 in the longitudinal direction and in a ratio of 10:1 in the transverse direction was obtained.

The layer structure and the properties of the finished film are shown in the following Tables.

TABLE 1

|  | Example 1 | Comparison Example 1 | Example 2 | Example 3 |
|---|---|---|---|---|
| Layer structure and layer thickness (μm) | P/E-copo 1 AP 0.5 EVAL 1 AP 0.5 P/E-copo 1 PP 25 P/E-copo 1 | P/E-copo 1 AP 0.5 EVAL 1 AP 0.5 P/E-copo 1 PP 25 P/E-copo 1 | P/E-copo 1 PP 25 P/E-copo 1 | P/E-copo 1 AP 0.5 EVAL 1 AP 0.5 P/E-copo 1 PP 25 P/E-copo 1 AP 0.5 EVAL 1 AP 0.5 P/E 1 |
| Total thickness (μm) | 30 | 30 | 27 | 33 |
| Additives in the sealing layer (% by weight) |  |  |  |  |
| Aliphat. amine | 0.5 | 0.2 | 0.5 | 0.5 |
| Ethylene/ methacrylic acid copolymer | 0.5 | — | — | 0.5 |
| Polylauric lactam | — | — | 0.2 | — |
| Polydimethyl siloxane | 0.3 | — | 0.3 | 0.7 |
| Erucic acid amide | — | 0.3 | — | — |

P/E-copo = propylene/ethylene copolymer
AP = modified polyolefines with polyfunctional groups
EVAL = hydrolyzed ethylene/vinyl acetate copolymer
PP = polypropylene

TABLE 2

| Film properties | Example 1 | Comparison Example 1 | Example 2 | Example 3 |
|---|---|---|---|---|
| Coefficient of friction film/film | 0.30 | 0.48 | 0.30 | 0.27 |
| Coefficient of friction film/metal | 0.20 | 0.35 | 0.20 | 0.17 |
| Haze (%) | 2.8 | 2.8 | 2.5 | 3.0 |
| Seal strength (N/15 mm) | 5 | 5 | 5 | 5 |
| O₂-permeability (cm³/m².d.bar) | 20 | 20 | 1000 | 8 |
| Antistatic behavior | adequate | inadequate | adequate | adequate |
| Behavior in packaging machine | very good | unsatisfactory | very good | very good |

COMPARISON EXAMPLE 1

To produce a layer combination, 0.2% by weight of N,N-bis-(2-hydroxyethyl-($C_{12}$–$C_{16}$)-alkylamine and 0.3% by weight of erucic acid amide were incorporated into 99.5% by weight of a propylene/ethylene copolymer containing 4.5% by weight of ethylene and havng a density of 0.90 g/cc, a melt index of 5 g/10 mins at 230° C./2.16 kp/cm² and a crystallite melting point of 140° C. for layer A, coextruded with a modified polypropylene=saponified copolymer, containing 0.7% by weight of grafted maleic acid anhydride, with a melt index of 5 g/10 mins at 250° C./2.16 kp/cm², for the adhesion-promoting layers and an ethylene/vinyl acetate copolymer containing 55 mole percent of vinyl acetate units, of which 96% are hydrolyzed, for the gas-barrier layer and the above-mentioned propylene- /ethylene copolymer for layer E, united by standard methods with the base film of polypropylene having a density of 0.905 g/cc, a melt index of 2 g/10 mins at 230° C./2.16 kp/cm$^2$ and a softening range of 160° to 166° C., and stretched in such a way that a composite film stretched into a ratio of 5:1 in the longitudinal direction and in a ratio of 10:1 in the transverse direction was obtained.

The layer structure and properties of the finished film are shown in the above Tables.

What is claimed is:

1. A heat-sealable composite film comprising a biaxially oriented polypropylene film as a base film, said base film having two surfaces and, on at least one surface thereof is disposed, a layer combination which comprises
   (A) a heat-sealable outer layer of polyethylene or of an ethylene copolymer containing at least 3% by weight of ethylene;
   (B) an adhesion-promoting layer of modified polyolefin;
   (C) gas-barrier layer of hydrolyzed ethylene/vinyl acetate copolymer containing from 50 to 80 mole percent of vinyl acetate units of which at least 90% are hydrolyzed;
   (D) an adhesion-promoting layer of modified polyolefin; and
   (E) a layer of polyethylene or of an ethylene copolymer containing at least 3% by weight of ethylene; each of the two layers A and B or D and E or layers B and C or C and D are combinable into one single layer by mixing the corresponding polymers; layer A containing an additive combination comprising
   (a) from 0.3 to 1% by weight, based on the sealable layer, of a long-chain aliphatic amine,
   (b) from 0.1 to 0.7% by weight, based on the sealable layer, of a dispersed thermoplastic polymer which is incompatible with the polyethylene or ethylene copolymer and which has a softening point at most 50° C. below or above the softening point of the polyethylene or ethylene copolymer, and
   (c) from 0.1 to 1.2% by weight, based on the sealable layer, of a polydialkyl siloxane having a viscosity of between about 10$^5$ and 10$^6$ m.Pa.s at 20° C.

2. A composite film as claimed in claim 1, wherein component (a) is a tertiary amine having a $C_{12}$-$C_{18}$ aliphatic radical and two hydroxyalkyl-($C_1$-$C_4$)-groups.

3. A composite film as claimed in claim 2, wherein component (a) is N,N-bis-(2-hydroxyethyl)-$C_{12}$-$C_{16}$-alkylamines.

4. A composite film as claimed in claim 1, wherein component (b) is an ethylene/methacrylic acid copolymer.

5. A composite film as claimed in claim 4, wherein component (b) is at least partly in the form of a moiety selected from the group consisting of a metal salt and polylauric lactamide.

6. A composite film as claimed in claim 1, wherein the modified polyolefin of layer B is a polypropylene or polyethylene containing grafted unit of α,β-monounsaturated dicarboxylic acids.

7. A composite film as claimed in claim 6, wherein the modified polyolefin is a polypropylene or polyethylene containing grafted unit of maleic acid or maleic acid anhydride.

8. A composite film as claimed in claim 1, wherein the polymer of layer C is a hydrolyzed ethylene/vinyl acetate copolymer containing from 60 to 75 mole percent vinyl acetate units of which more than 95% are hydrolyzed.

9. A composite film as claimed in claim 1, wherein layer B and layer D are identical.

10. A composite film as claimed in claim 1, wherein layer A and E are identical.

11. A package comprising material wrapped in a composite film as claimed in claim 1.

12. A package as claimed in claim 11, wherein the wrapped material is a foodstuff.

13. A composite film as claimed in claim 1, wherein said layer combination is at least monoaxially oriented.

14. A composite film as claimed in claim 1, wherein on the other surface of the base film not containing the layer combination is disposed a layer A, a layer combination of layer A to layer E or layer B and layer C or one layer of a polymer mixture of the polymers of the layers B and C.

15. A composite film as claimed in claim 1, wherein component (c) is polydimethyl siloxane.

* * * * *